United States Patent [19]

Woodsum

[11] Patent Number: 4,703,462

[45] Date of Patent: Oct. 27, 1987

[54] VIRTUALLY STEERABLE PARAMETRIC ACOUSTIC ARRAY

[75] Inventor: Harvey C. Woodsum, Nashua, N.H.

[73] Assignee: Sanders Associates, Inc., Nashua, N.H.

[21] Appl. No.: 723,018

[22] Filed: Apr. 15, 1985

[51] Int. Cl.$^4$ .......................... G01S 9/66; G01S 9/68
[52] U.S. Cl. ...................................... 367/92; 367/99; 367/100; 364/516; 364/724
[58] Field of Search ................. 367/103, 105, 92, 107, 367/99, 100; 73/625, 626; 128/660, 661; 364/724, 516; 342/147, 195

[56] References Cited

U.S. PATENT DOCUMENTS

| | | | |
|---|---|---|---|
| 3,324,452 | 6/1967 | Brightman et al. | 340/5 |
| 3,913,060 | 10/1975 | Westervelt et al. | 367/107 |
| 4,188,667 | 2/1980 | Graupe et al. | 364/724 |
| 4,190,818 | 2/1980 | Follin et al. | 367/138 |
| 4,542,744 | 9/1985 | Barnes et al. | 128/660 |

OTHER PUBLICATIONS

Marple, Jr., S. Lawrence, 'Corrections to "Spectrum Analysis—A Modern Perspective"', *Proceedings of the IEEE*, vol. 70, No. 10, Oct. 1982, p. 1238.
Van Schooneveld, C. and Sondag, M., "Spectrum Analysis: On the Application of Data Windowing to Kay and Marple's Results", *Proceedings of the IEEE*, vol. 71, No. 6, Jun. 1983, pp. 776-779.
'Correction to "Spectrum Analysis: On the Application of Data Windowing to Kay and Marple's Results"', *Proceedings of the IEEE*, vol. 71, No. 11, Nov. 1983, pp. 1324-1325.
Westervelt, P. J., "Parametric Acoustic Array", *J. Acoust. Soc. Am.* 35, 1963, pp. 535-537.
Kay, S. and Marple, S., "Spectrum Analysis—A Modern Perspective", *Proceedings of the IEEE*, vol. 69, p. 1380.
Westervelt, P. J., "Virtual Sources in the Presence of Real Sources", *Proceedings of the 1969 ARL Symposium on Nonlinear Acoustics*, pp. 165-182.
Moffett, M. and Mello, P., "Parametric Acoustic Sources of Transient Signals", *J. Acoust. Soc. Am.*, vol. 66(4), Oct. 1979, pp. 1182-1187.

*Primary Examiner*—Thomas H. Tarcza
*Assistant Examiner*—Daniel T. Pihulic
*Attorney, Agent, or Firm*—Richard I. Seligman; Stanton D. Weinstein

[57] ABSTRACT

The invention concerns an application of linear system parameter estimation techniques to finite amplitude sonar devices, to extract fine grained angular position information about echo sources. The invention makes use of the fact that the waveform return by a reflecting object within the sonar's beam varies according to its relative angular position from the receiver, and a discovery that this variation may be fit to a linear system model using autoregressive estimation theory to extract the nature of the variation. In all cases, the information is extracted without the mechanical or electrical steering of the sonar transmitting beam.

12 Claims, 3 Drawing Figures

VIRTUALLY STEERABLE PARAMETRIC ACOUSTIC ARRAY

BACKGROUND OF THE INVENTION

The present invention relates to sonar systems, and more particularly, to a parametric acoustic array sonar system for extracting the angular position of far field echo sources.

Most sonar systems operate by generating an electrical carrier signal. This carrier signal is then applied to a transducer, thereby producing an acoustic signal travelling along a given direction. When this transmitted acoustic signal strikes an object in its path, another acoustic signal is created. Its direction of travel will be back towards the transmitter. This in turn strikes a receiving transducer causing an electrical signal to be generated which can then be analyzed to determine the bearing of the reflecting object.

When the beam, or physical width of the transmitted sonar signal, is narrow enough, the bearing of the reflecting object is the same as the bearing of the return signal. In practice, however, this has proven to be most difficult to achieve. As the sonar beam travels through the medium, it disperses within a finite arc, with the beam's power diminishing with the distance from its center. As such, it has become the practice in the prior art to physically steer the beam. When a maximized return signal is received, the beam center will be directed at the reflecting object, and its bearing determinable as the same as the bearing of the transmitted signal. While the transmitted signal can be physically steered by mechanical positioning of the emitting transducer, the more common and accurate practice has been to use an array of mechanically fixed transducers, accomplishing a steered beam by manipulating the electrical signal applied to each element.

Thus, the prior art has sought a way to generate a narrow sonar beam without compromising its ability to be steered electronically. For example, the parametric array described in Westervelt, P. J., "Parametric Acoustic Array", J. Acoust. Soc. Vol. 35, No. 4, pp., 535-537, April 1963 was a device which generated a directional beam by amplitude modulating a highly collimated sound wave. This result was accomplished by simultaneous transmission of two high frequency waves which interact with the medium in a non-linear fashion to produce two new waves, one of which has a frequency equal to the sum of the original two frequencies and the other equal to the difference. The acoustic properties of the transmission medium were used to filter the transmitted signal so that only the narrowly focused difference wave, or lowest frequency component, survived over distance.

The accuracy of the transmitted sonar wave is a function of the accuracy of the electronic signals applied to each transducer of the array. As such, other prior art apparatuses have been concerned with techniques for precise control of the electronic signals. U.S. Pat. No. 3,324,425 issued June 6, 1967 to Brightman et al. makes use of the fact that if the phase of the signal applied to each transducer is delayed by a time interval equal to the distance between adjacent transducers in each row divided by the velocity of propagation in the medium surrounding the transducers, an end-fire beam substantially parallel to the array will be propagated. The azimuthal angle of the beam may then be controlled by adjusting the phase delay. This provided an improved phase control system using a time division multiplexed scheme based upon the use of high speed digital electronic counters and digital-to-analog converters. In a similar fashion, U.S. Pat. No. 4,190,818 issued Feb. 26, 1980 to Follin et al. teaches a means for steering the sonar beam by delaying the phase of the drive signal as a function of transducer position. It is representative of a class of prior art apparatuses which have improved beam control by using techniques other than amplitude modulation to generate the high frequency drive signal, such as pulse duration modulation, which can be used to produce the same non-linear combining effect described by Westervelt but by using a single high frequency carrier rather than two.

SUMMARY OF THE INVENTION

It is evident then, that the need for physically steering the acoustic beam in order to extract information about the bearing of a reflecting object adds to the complexity and decreases the reliability of an acoustic sonar system. Thus, a general object of the present invention is to provide such information without the physical steering of the acoustic beam.

Another object of the invention is to provide such angular positional information without the need for electrical beamsteering and the attendant increase in cost and complexity.

Briefly, these and other objects of the invention are accomplished by fitting a parametric model to the predictable variations in angular position of an echo source. The portions of the return signal which do not vary with the position of the echo source are first removed by a series of integrators and a filter with an impulse response matched to the transmitted envelope signal. The filter output signal is then subjected to a parametric modelling operation. This determines the location of the linear system complex poles describing the signal's content. The pole locations are then input to a mapping calculation device which converts the complex pole locations to an angle. These and still further objects, advantages and novel features will become apparent from the following detailed description and accompanying drawings, in which:

DESCRIPTION OF THE PREFERRED EMBODIMENT

Figure 1:
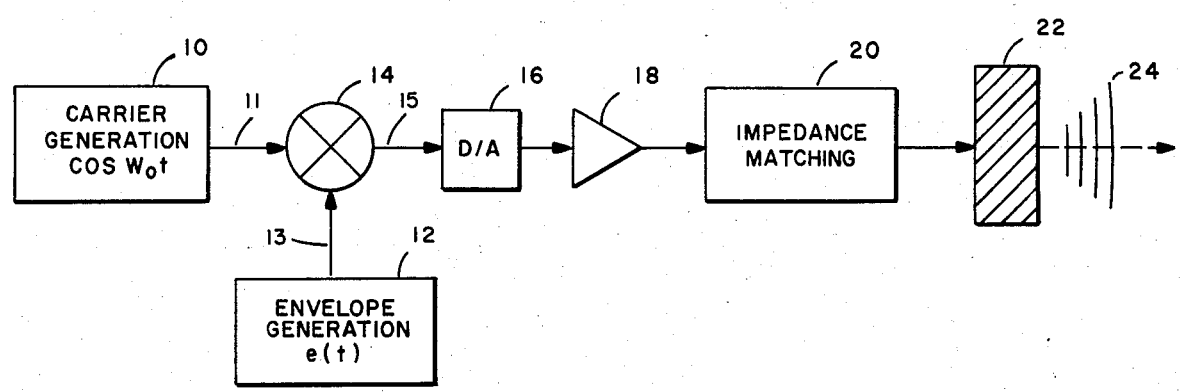
FIG. 1 is a block diagram illustrating a sonar transmitter used to launch an acoustic wave into the transmission medium.

Referring now to the drawings in which like reference numerals designate like or corresponding parts or signals throughout the several views, there is shown in FIG. 1 a sinusoidal signal generator 10 which provides a sinusoidal carrier signal 11. This is preferably generated as a series of digital samples. An amplitude envelope function generator 12 outputs an envelope function 13 of general form e(t), also preferably in digital form. The two signals are then multiplied, by a multiplier 14 which produces the desired amplitude modulated signal 15 for transmission. When the signals 11 and 13 are digitally generated, the sampling rate used in their generation should be sufficiently high enough to satisfy the Nyquist sampling criterion of twice the highest frequency component in the resulting amplitude modulated signal 15 at the output of multiplier 14. The signal is then converted to analog form by a digital-to-analog converter 16 to make it suitable for transmission. An amplifier 18 and an impedance matching network 20 are necessary before applying the signal to one or more electrical to acoustic transducers 22 (of which only one is shown for clarity), used to produce the transmitted acoustic signal 24.

Figure 2:
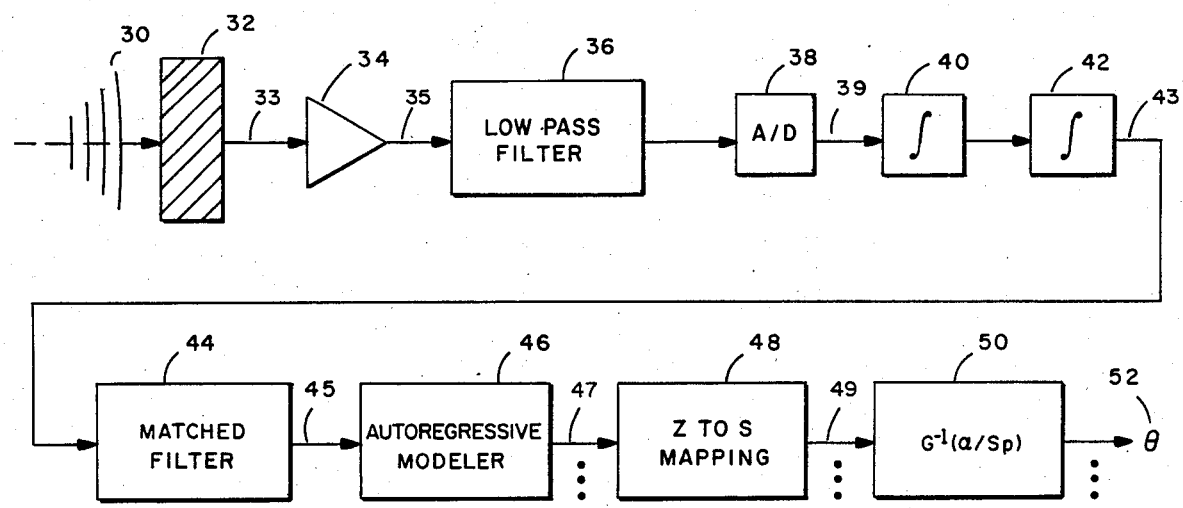
FIG. 2 is a block diagram illustrating a sonar receiver and associated matched filter and parametric modeler according to the present invention.

The receiver, in FIG. 2, must first convert the acoustic signal 30 returned from a reflecting object to electrical form via one or more acoustic to electrical transducers 32 (of which only one is shown for clarity). At the output of these transducers 32, the electrical signal 33 is expressed mathematically as a frequency domain signal in the form $$Y(f,\theta) = H(f,\theta)E(f)$$

where f is frequency, $\theta$ is the bearing of a reflecting object, E(f) is the Fourier transform of the transmitted envelope signal e(t), H(f,$\theta$) is the transfer function of the transmitting medium, and Y(f,$\theta$) is the received electrical signal 33. Westervelt, P. J., in "Virtual Sources in the Presence of Real Sources", *Proceedings of the 1969 ARL Symposium on Nonlinear Acoustics*, pp 165–180, has derived a closed form expression for the far field pressure of a signal generated by a parametric acoustic transmitting array operated in end-fire mode. The medium transfer function, H(f,$\theta$) for this array can be found by evaluting this expression at a given point in space and taking its Fourier transform. This medium transfer function will be of the form $$H(f,\theta) = \frac{K \, (j2\pi f)^2}{G(\theta) \, \{j2\pi f - [\alpha/G(\theta)]\}}$$

where K is a gain factor given by $$K = \frac{\beta P_o^2 A}{r \rho_o^{-2} C_o^{-4}}$$

in which
$\beta$ is the parameter of non-linearity for the medium (3.5 for water)
$P_o$ is the initial pressure of the carrier
A is the sound source area
r is the distance from the sound source to the receiver
$\rho_o$ is the ambient density
$C_o$ is the ambient speed of sound
and $$G(\theta) = C_o^{-1}(1 - \cos\theta)$$

and
$\alpha$ is the attenuation coefficient for a sound wave in the medium at the carrier frequency of the transmitted amplitude modulated signal.

Thus, the expression for the electrical signal 33 at the output of the receiver transducers 32 can be rewritten as $$Y(f,\theta) = \frac{K \, (j2\pi f)^2 \, E(f)}{G(\theta) \, \{j2\pi f - [\alpha/G(\theta)]\}}$$

or, converting to complex s-plane rotation by substituting $$\omega = 2\pi f$$

and $$s = j\omega,$$

the expression now becomes $$Y(s,\theta) = \frac{K \, s^2 \, E(s)}{G(\theta) \, \{s - [\alpha/G(\theta)]\}}$$

also making the medium transfer function more readily recognizable as a system with two zeroes at s=0 and a single pole at $s_p = \alpha/G(\theta)$.

From the receiver transducers 32, the signal 33 is fed to an amplifier 34, appropriately isolated, and preferably with automatic gain control sufficient to remove the effects of the gain constant, K/G($\theta$). Thus, at the output 35 of amplifier 34, the signal is of the form $$Y_1(s,\theta) = \frac{s^2 \, E(s)}{s - [\alpha/G(\theta)]}$$

The electrical signal is then input to a low pass filter 36 prevent aliasing in the output 39 of the following analog-to-digital converter 38. At the output 39 of this converter 38 the signal's frequency domain representation will be properly given by $$Y_2(z,\theta) = \frac{z^{-2} E(z)}{(1 - az^{-1})}$$

which is the same expression for signal 35 written above but in z-plane form because the electrical signal 39 will now be a discrete time signal, having been converted to digital form by analog-to-digital converter 38. In this expression, a, denotes the pole location previously found, $s_p$, but after a suitable s-plane to z-plane mapping has been applied to it, such as the impulse invariant mapping $$z = e^{sT}$$

where T is the sampling period of the analog-to-digital converter 38.

At the output 43 of the pair of digital integrators 40 and 42, the signal is now of the form $$Y_3(z,\theta) = \frac{E(z)}{(1 - az^{-1})}$$

These digital integrators are implemented in any suitable fashion such as a digital filter with coefficients derived via the bilinear transformation. The signal is then input to a matched filter 44. This filter's transfer function is the reciprocal of the Fourier transform of the envelope signal 13, e(t), used in the transmitter to modulate the carrier 11. If e(t) is chosen to be a simple complex sinusoid of the form $$e(t) = E_o \cos(\omega t) e^{\lambda t}$$

then this matched filter 44 is implemented as a single complex pole digital filter.

In a similar fashion, if e(t) is chosen to be a sum of complex sinusoids, then the matched filter 44 is implemented so that it has a number of complex poles, one for each complex sinusoid.

Figure 3:
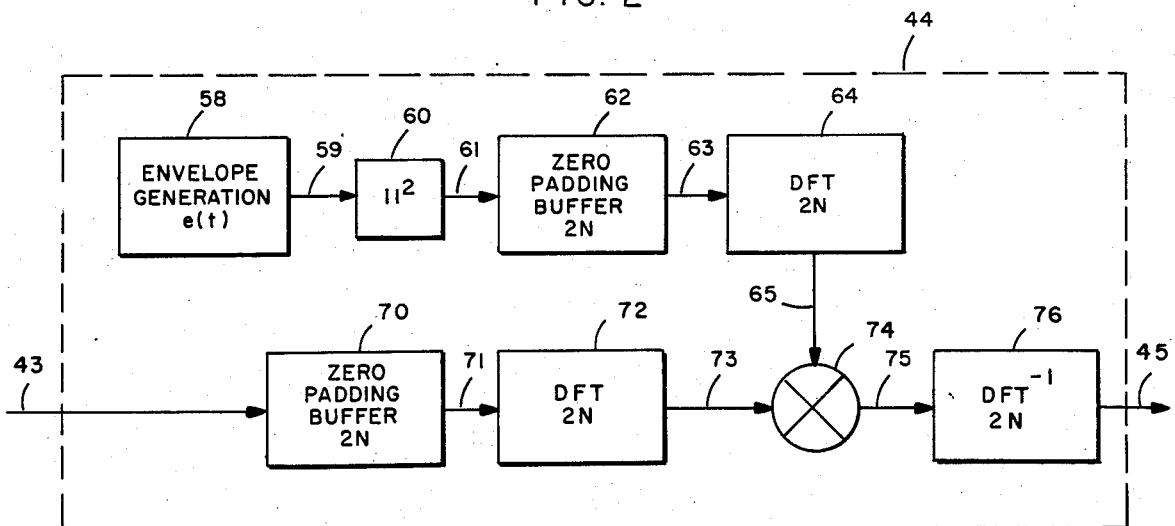
FIG. 3 is a block diagram illustrating a particular embodiment of the Inverse Matched Filter depicted in FIG. 2.

If a more general envelope signal 13 is chosen, the matched filter 44 is implemented as a convolver, making use of the Discrete Fourier Transform to convolve via multiplication in the frequency domain, as shown in FIG. 3. In this convolver-type implementation of the matched filter 44, a digital envelope signal 59, e(t), is generated by device 58. Recall that the same envelope signal was generated as part of the transmitter, and in fact, device 58 may be implemented by adding second digital output to device 12 of FIG. 1. However, the sampling frequency used to create digital signal 59 need not be the same as that used for signal 13, so the devices are shown separately. However, the sampling rate used in generating digital envelope signal 59 must be the same as the sampling rate of analog-to-digital converter 38 used to create signal 39. Signal 59 is then input to magnitude-squaring device 60 which calculates the complex magnitude of each sample and then squares it, generating signal 61. Zero padding buffer 62 first groups the samples of signal 61 into blocks of a particular size, N. The number N must be an integer greater than the period of envelope signal e(t) divided by the sampling frequency used to generate the digital envelope signal 59. Zero padding buffer 62 then appends N additional zero-valued samples to the end of each block. Thus, the output 63 of zero padding buffer 62 will be a digital signal having twice the sampling rate of digital signal 61. Signal 63 is fed to Discrete Fourier Transform (DFT) device 64 which operates on the samples of signal 63 in blocks of length 2N as they become available at the output of zero padding buffer 62. The result is frequency domain signal 65. In similar fashion, zero padding buffer 70 operates on digital signal 43 to produce groups of N samples appended with N additional zero valued samples. The output 71 of zero padding buffer 70 is then input to DFT device 72 in blocks of 2N samples. The output 73 of DFT device 72 is multiplied w signal 65 by digital multiplier 74. Multiplier's 74 output is then operated on in groups of 2N samples by Inverse Discrete Fourier Transform (IDFT) device 76, which returns the signal to the time domain. The digital signal at the output of IDFT 76 is the match filter output signal 45. Regardless of the manner of implementation of the matched filter 44, the resulting output signal 45 is of the form $$Y_4(z,\theta) = \frac{1}{1 - az^{-1}}$$

Thus, the received signal's variations have now been completely characterized with the exception of the location of the single pole, a. A number of techniques exist for finding the location of a pole given the system time domain response. These methods invariably use an autoregressive model as described by Kay, S. M. and Marple, S. L., Jr. in "Spectrum Analysis—A Modern Perspective", *Proceedings of the IEEE*, Vol. 69, No. 11, p 1380-1419, November 1981. These methods assume the answer to be of the form $$y(n) = ay(n-1) + w(n)$$

where y(n) is the system time domain response, and w(n) is a mean square error sequence. The methods vary in their way of minimizing the signal power of w(n). In the maximum entropy method, for example, the pole location a is estimated by $$a = \frac{\Phi_{yy}(1)}{\Phi_{yy}(0)}$$

in which $\Phi_{yy}(\tau)$ is the autocorrelation function of the signal 45 input to the autoregressive modeler 46. Autoregressive modeling is also described in U.S. Pat. No. 4,188,667 issued Feb. 12, 1980 to D. Graupe et al. and in U.S. Pat. No. 4,542,744 issued Sept. 24, 1985 to C. W. Barnes et al., which are hereby incorporated by reference. The output of device 46 will be a digital signal 47 representing an estimate of the complex pole location, a.

Although the pole location has now been estimated, it will be in z-plane or discrete time form since it was estimated from a discrete time, sampled signal. It must be un-mapped to a suitable continuous time or s-plane representation by device 48, using the inverse of the mapping technique used to previously map the inverse matched filter 44 and digital integrators 40 and 42. If the impulse invariant mapping was used, for example, this mapping is $$s_p = \frac{\ln a}{T}$$

T being the sampling period of the analog-to-digital converter, as previously mentioned. Device 48 calculates this mapping, producing digital signal 49 representing the continuous time complex pole location.

The final step is the conversion calculation completed by device 50. The pole location $s_p$ must be converted to a bearing angle, $\theta$. Recalling the previous identities $$s_p = \frac{\alpha}{G(\theta)}$$

and $$G(\theta) = \frac{\alpha}{s_p} = C_0^{-1}(1 - \cos\theta),$$

it can be seen that this calculation becomes $$\theta = G^{-1}\left(\frac{\alpha}{s_p}\right)$$

where $G^{-1}$ denotes the inverse of function $G(\theta)$ as previously defined.

It should be noted that in the preferred embodiment, devices 46, 48 and 50 of the receiver could be embodied by appropriate digital logic or a microprocessor programmed to perform the indicated steps.

It should be recognized that the above case may be generalized for multiple reflecting objects, in which case the response would be a sum of responses to each object. In such an instance, the autoregressive modeler 46 would output a plurality of pole locations at 47, as indicated by the dots, and the devices 48 and 50 would operate on each to produce a plurality of s-plane poles 49 and bearing angles 52.

Adaptations can be made for other acoustic array configurations, as long as the Fourier transform of the array's pressure function results in a linear system with an integral number of zeroes and complex pole locations whose values can be autoregressively estimated.

Other advantages and modifications of the present invention may be possible and evident to those skilled in the art. Therefore, it should be understood that the intent is to limit the present invention only by the scope of the claims which follow.

Whereas, I claim:

1. A sonar system of the type wherein a carrier signal is modulated by an envelope signal and the modulated carrier signal is returned from an echo source as a reflected signal, the improvement comprising:
   means for converting the reflected signal to a digital reflected signal;
   a first digital integrator for digitally integrating the digital reflected signal and producing a digital integrated signal;
   a digital filter having a response matched to the envelope signal for digitally filtering the digital integrated signal thereby producing a digital filtered signal;
   means for autoregressive modelling the digital filtered signal as the impulse response of a filter having a complex s-plane pole thereby providing a digital complex pole location; and
   means for converting the digital complex pole location to a digital bearing signal proportional to the bearing of the echo source.

2. Apparatus as defined in claim 1 wherein the digital filter means comprises a single complex pole digital filter.

3. Apparatus as defined in claim 1 additionally comprising a second digital integrator operably connected to the first digital integrator to produce the digital integrated signal.

4. Apparatus as defined in claim 3 wherein the autoregressive modelling means comprises means for generating a complex pole for each of a plurality of echo sources.

5. Apparatus as defined in claim 3 wherein the autoregressive modelling means comprises means for maximum entropy minimization.

6. Apparatus as defined in claim 1 wherein the digital filter comprises:
   means for generating a digital magnitude-squared signal representing the magnitude-squared of the envelope signal,
   means for zero padding the digital magnitude-squared signal, thereby producing a digital zero padded magnitude-squared signal;
   first means for computing the Discrete Fourier Transform of the digital zero padded magnitude-squared signal, thereby producing a first digital Fourier transformed signal;
   means for zero padding the digital integrated signal, thereby producing a digital zero padded integrated signal;
   second means for computing the Discrete Fourier Transform of the digital zero padded integrated signal, thereby producing a second digital Fourier transformed signal;
   a digital multiplier for multiplying the first Fourier transformed signal and the second Fourier transformed signal, thereby producing a digital multiplier output signal; and
   means for computing the inverse Discrete Fourier Transform of the digital multiplier output signal, thereby producing the digital filtered signal.

7. Apparatus as defined in claim 6 wherein the first means for computing the Discrete Fourier Transform comprises means for computing the Fast Fourier Transform.

8. An apparatus as defined in claim 6 where the second means for computing the Discrete Fourier Transform comprises means for computing the Fast Fourier Transform device.

9. Apparatus as defined in claim 6 where the means for computing the inverse Discrete Fourier Transform comprises means for computing the inverse Fast Fourier Transform.

10. A method for finding the position of a reflecting object in an acoustic medium, in which a carrier signal is modulated by an envelope signal, and the modulated carrier signal is returned by the object as a reflected signal, the improvement comprising the steps of:
    (a) converting the reflected signal to a digital reflected signal;
    (b) integrating the digital reflected signal to provide a digital integrated signal;
    (c) filtering the digital integrated signal by a digital filter having a response method to the envelope signal, to provide a digital filtered signal;
    (d) autoregressively modelling the digital filtered signal as the response of a filter having a complex pole, to provide a digital complex pole location; and
    (e) converting the digital complex pole location to a bearing angle.

11. The method of claim 10 further comprising, before step (a), the steps of:
    (i) determining the transfer function of the acoustic medium; and
    (ii) determining the number of poles in the envelope signal.

12. The method of claim 10 further comprising the step of, between step (b) and step (c), the step of:
    (iii) integrating the digital integrated signal to provide a digital integrated signal.

* * * * *